(12) United States Patent
Lee et al.

(10) Patent No.: US 10,205,138 B2
(45) Date of Patent: Feb. 12, 2019

(54) RECHARGEABLE BATTERY

(71) Applicant: SAMSUNG SDI CO., LTD., Yongin-si, Gyeonggi-do (KR)

(72) Inventors: Jun-Yong Lee, Yongin-si (KR); Sang-Won Byun, Yongin-si (KR); Byung-Kyu Ahn, Yongin-si (KR)

(73) Assignee: Samsund SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/213,932

(22) Filed: Jul. 19, 2016

(65) Prior Publication Data

US 2017/0141358 A1    May 18, 2017

(30) Foreign Application Priority Data

Nov. 18, 2015  (KR) .................. 10-2015-0161903

(51) Int. Cl.
*H01M 2/02* (2006.01)
*H01M 2/06* (2006.01)
(Continued)

(52) U.S. Cl.
CPC ........... *H01M 2/0267* (2013.01); *H01M 2/06* (2013.01); *H01M 2/08* (2013.01); *H01M 2/1094* (2013.01); *H01M 10/0431* (2013.01)

(58) Field of Classification Search
None
See application file for complete search history.

(56) References Cited

U.S. PATENT DOCUMENTS 5,584,429 A * 12/1996 Savage ............... B65B 5/024
229/103.3
2007/0037044 A1   2/2007 Sato et al.
(Continued)

FOREIGN PATENT DOCUMENTS

JP      2006-120419 A   5/2006
JP          5011677 B2   6/2012
(Continued)

OTHER PUBLICATIONS

Machine translation of Egawa et al. WO 2016/035395 A1.*
(Continued)

*Primary Examiner* — Wojciech Haske
(74) *Attorney, Agent, or Firm* — Lewis Roca Rothgerber Christie LLP (57) ABSTRACT

A rechargeable battery includes an electrode assembly including a first electrode, a separator, and a second electrode, a case for accommodating the electrode assembly, and defining an opening at a side of the case for receiving the electrode assembly, a cap assembly mounted to the case at the opening of the case, and including a first electrode terminal and a second electrode terminal respectively electrically connected to the first electrode and the second electrode, and a protective member for covering the case and the cap assembly, and including a first bonding portion corresponding to a bottom surface of the case, a plurality of second bonding portions respectively corresponding to first lateral walls of the case, and a plurality of finish portions respectively overlapping opposite ends of the second bonding portions.

11 Claims, 11 Drawing Sheets

(51) Int. Cl.
*H01M 2/08* (2006.01)
*H01M 10/04* (2006.01)
*H01M 2/10* (2006.01)

(56) References Cited

U.S. PATENT DOCUMENTS

| | | | |
|---|---|---|---|
| 2013/0034764 A1* | 2/2013 | Ochi | H01M 2/0262 |
| | | | 429/99 |
| 2013/0260220 A1* | 10/2013 | Ahn | H01M 2/04 |
| | | | 429/164 |
| 2014/0205895 A1 | 7/2014 | Kim et al. | |
| 2014/0295232 A1 | 10/2014 | Kim et al. | |
| 2015/0079460 A1 | 3/2015 | Byun et al. | |

FOREIGN PATENT DOCUMENTS

| | | |
|---|---|---|
| KR | 10-2013-0129729 A | 11/2013 |
| KR | 10-2014-0094205 A | 7/2014 |
| KR | 10-2014-0120189 A | 10/2014 |
| WO | WO 2016/035395 A1 | 3/2016 |

OTHER PUBLICATIONS

EPO Extended Search Report dated Oct. 31, 2016, for corresponding European Patent Application No. 16186975.5 (8 pages).
EPO Office Action dated Jun. 27, 2017, for corresponding European Patent Application No. 16186975.5 (3 pages).

\* cited by examiner

RECHARGEABLE BATTERY

CROSS-REFERENCE TO RELATED APPLICATION

This application claims priority to, and the benefit of, Korean Patent Application No. 10-2015-0161903, filed in the Korean Intellectual Property Office on Nov. 18, 2015, the entire contents of which are incorporated herein by reference.

BACKGROUND

1. Field

The present disclosure herein relates to a rechargeable battery.

2. Description of the Related Art

A rechargeable battery may be repeatedly charged and discharged, unlike a primary battery that is incapable of being recharged. The rechargeable battery having a small capacity may be used for a portable small electronic device, such as a mobile phone, a laptop computer, or a camcorder. The rechargeable battery having a large capacity may be widely used for a motor driving power source of a hybrid vehicle, or the like.

The rechargeable battery may be configured to have a positive electrode, a separator, and a negative electrode, which are accommodated in a case together with an electrolyte solution. The case may be configured to have various shapes, such as a prism, a pouch, a sphere, or the like.

The case made of a metal material, such as aluminum or the like, seals an interior thereof with a cap plate or the like after an electrode assembly is accommodated therein.

Herein, an imperfect sealing due to an assembly tolerance between the cap plate and the case may lead to an error.

The above information disclosed in this Background section is only for enhancement of understanding of the background, and therefore may contain information that does not form the prior art.

SUMMARY

Embodiments of the present invention provide a rechargeable battery that has an improved sealing force between a cap plate and a case.

An embodiment of the present invention provides a rechargeable battery including an electrode assembly including a first electrode, a separator, and a second electrode, a case for accommodating the electrode assembly, and defining an opening at a side of the case for receiving the electrode assembly, a cap assembly mounted to the case at the opening of the case, and including a first electrode terminal and a second electrode terminal respectively electrically connected to the first electrode and the second electrode, and a protective member for covering the case and the cap assembly, and including a first bonding portion corresponding to a bottom surface of the case, a plurality of second bonding portions respectively corresponding to first lateral walls of the case, and a plurality of finish portions respectively overlapping opposite ends of the second bonding portions.

The first lateral walls of the case may face each other, and the case may further include a pair of second lateral walls connected to the first lateral walls for defining a space for accommodating the electrode assembly.

The first bonding portion may include third sub members for overlapping the bottom surface of the case.

A width of one of the third sub members may be equal to, or greater than, a half of a width of the bottom surface of the case.

The width of the bottom surface of the case may be equal to a width of the one of the third sub members in a direction perpendicular to a second folding line that is formed by folding the one of the third sub members to the bottom surface.

The edges of the third sub members may overlap.

The finish portions may be respectively folded along fourth folding lines from a cap plate toward the first lateral walls.

The finish portions may be respectively welded to the second bonding portions.

The finish portions may respectively include a first part becoming narrower when moving away from the fourth folding lines, and a second part connected to the first part.

The first part may overlap the protective member, and the second part may extend from the first part.

The line of the first bonding portion may be orthogonal to the extended line of the second bonding portions.

The protective member may define openings for exposing the first electrode terminal and the second electrode terminal, respectively.

DETAILED DESCRIPTION

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, a rechargeable battery according to an embodiment of the present invention will be described in detail with reference to the accompanying drawings.

Figure 1:
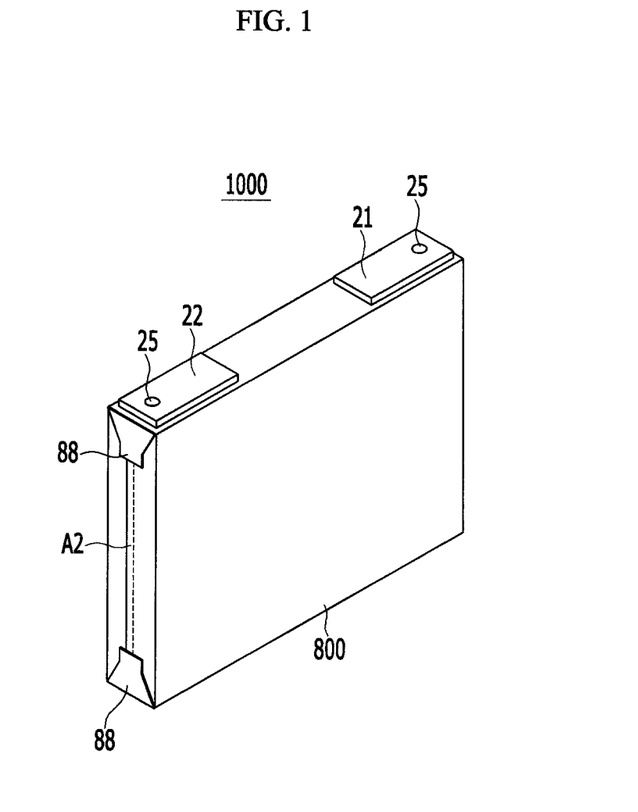
FIG. 1 is a perspective view illustrating a rechargeable battery according to an embodiment of the present invention.
Figure 2:
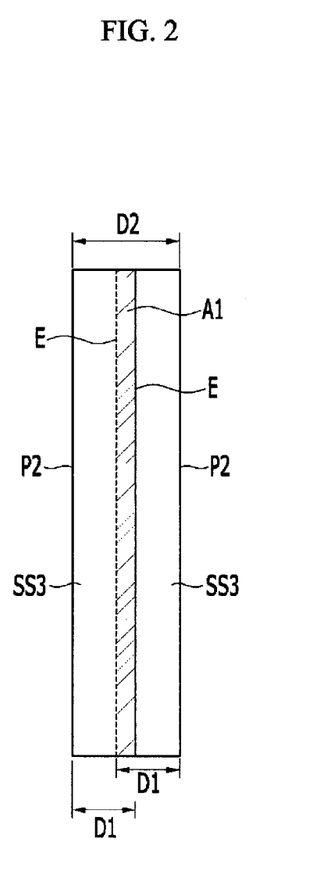
FIG. 2 is a top plan view illustrating a bottom surface of the rechargeable battery shown in FIG. 1.

FIG. 1 is a perspective view illustrating a rechargeable battery according to an embodiment of the present invention, and FIG. 2 is a top plan view illustrating a bottom surface of the rechargeable battery shown in FIG. 1.

As shown in FIGS. 1 and 2, the rechargeable battery 1000 according to an embodiment of the present invention may include a battery assembly 101, and a protective member 800 for covering and protecting the battery assembly. A positive terminal (e.g., a first electrode terminal) 21 and a negative terminal (e.g., a second electrode terminal) 22 of the battery assembly 101 may protrude upward from the protective member 800. The protective member 800 may be made of one sheet, and may include a plurality of bonding portions A1 and A2, and a finish portion 88. The protective member 800 may be a polymer sheet, and may include polyethylene terephthalate (PET) or polyimide (PI).

Figure 3:
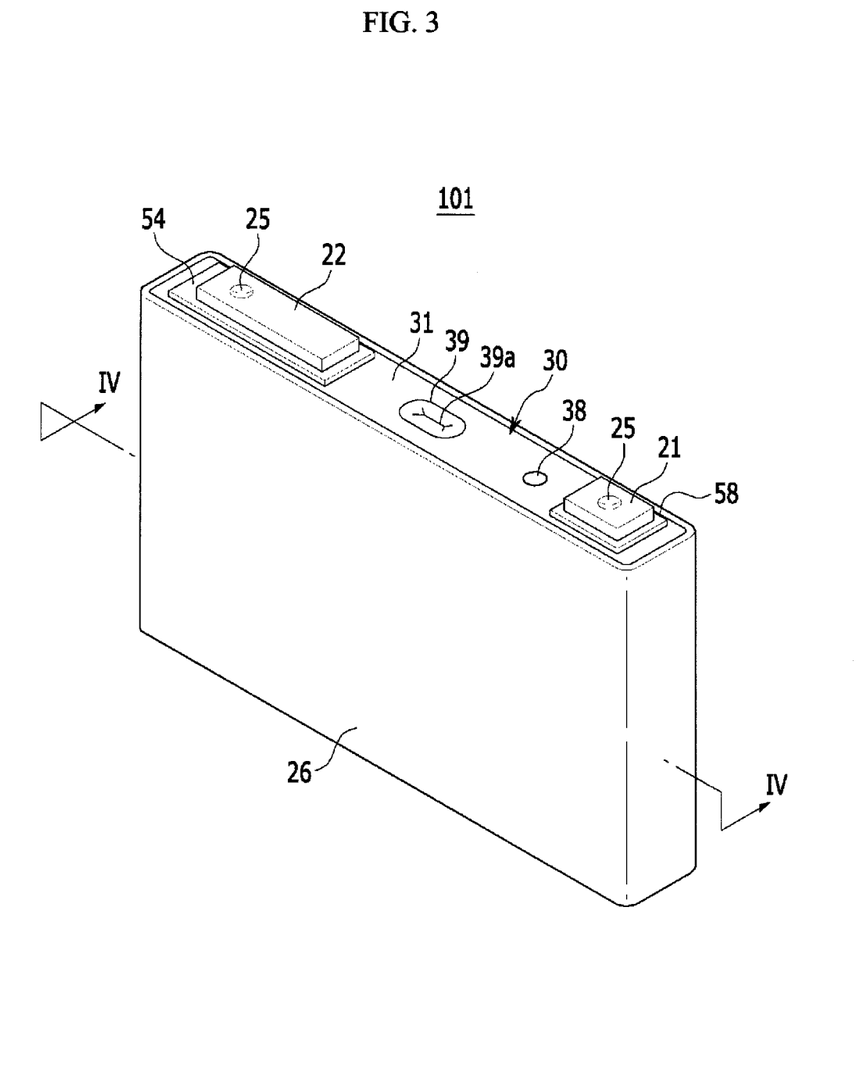
FIG. 3 is a perspective view illustrating a battery assembly according to an embodiment of the present invention.
Figure 4:
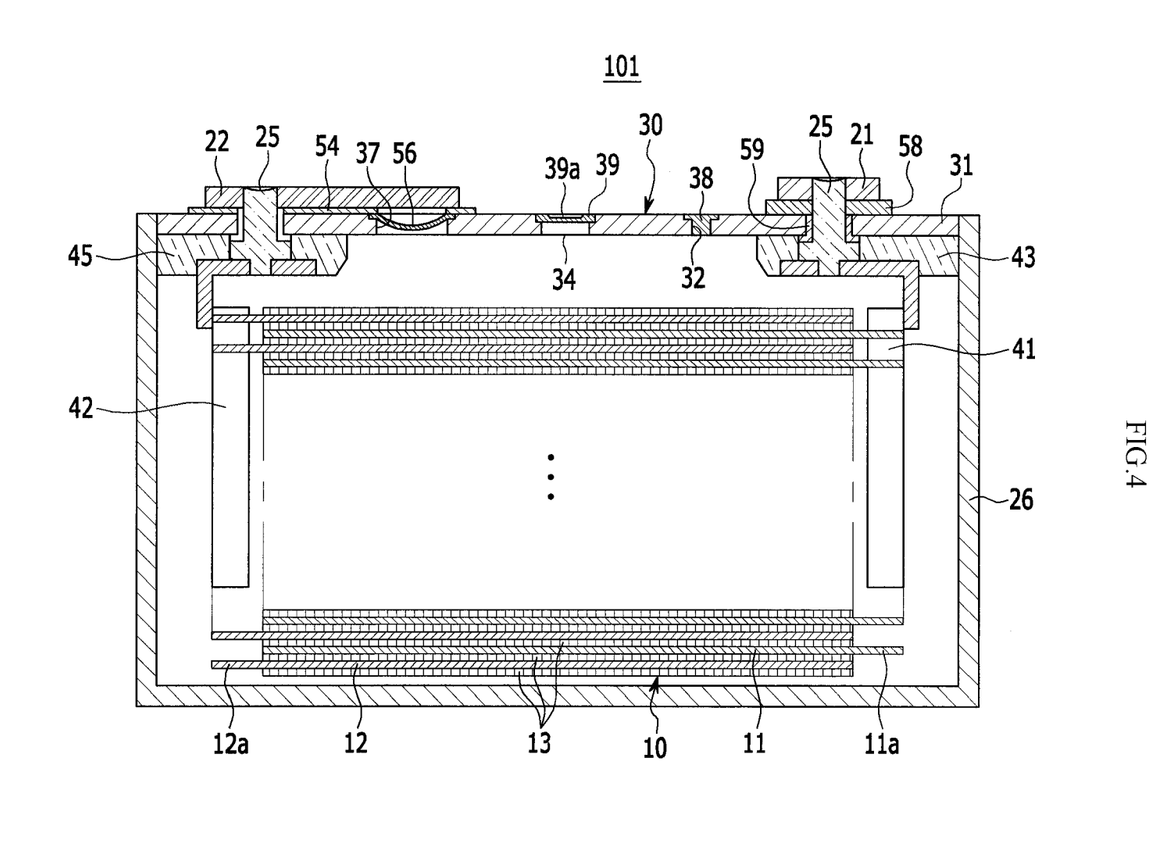
FIG. 4 is a cross-sectional view taken along the IV-IV line of FIG. 3.

FIG. 3 is a perspective view illustrating a battery assembly according to an exemplary embodiment of the present invention, and FIG. 4 is a cross-sectional view taken along the IV-IV line of FIG. 3.

As shown in FIGS. 3 and 4, the battery assembly 101 according to an embodiment of the present invention may include an electrode assembly 10, and a case 26 for accommodating the electrode assembly 10, the case 26 containing an electrolyte. The battery assembly 101 may also include a cap assembly 30 for sealing an opening of the case 26. The battery assembly 101 of the present embodiment will be described as a non-limiting example of a lithium ion secondary battery configured to have a prism shape.

The electrode assembly 10 may be formed as a jelly roll type electrode assembly by spirally winding a positive electrode 11 (or a first electrode) and a negative electrode 12 (or a second electrode) with a separator 13 therebetween.

The positive electrode 11 and the negative electrode 12 may respectively include coated regions of current collectors formed of a thin metal foil, on which an active material may be coated, and may respectively include positive and negative electrode uncoated regions 11a and 12a of the current collectors on which no active material is coated. As a non-limiting example, the coated region of the positive electrode 11 may be formed by coating a base material formed of a metal foil, such as an aluminum foil, with an active material, such as transition metal oxide or the like. Also, the coated region of the negative electrode 12 may be formed by coating a base material formed of a metal foil, such as a copper or nickel foil, with an active material, such as carbon, graphite, or the like.

The positive electrode uncoated region 11a may be formed on one lateral end of the positive electrode 11 in a longitudinal direction of the positive electrode 11, and the negative electrode uncoated region 12a may be formed on one lateral end of the negative electrode 12 in a longitudinal direction of the negative electrode 12.

The positive electrode uncoated region 11a and the negative electrode uncoated region 12a may be on sides that are opposite to each other with respect to the coated regions. Further, the positive electrode 11 and the negative electrode 12, with the separator 13 serving as an insulator interposed therebetween, may be spirally wound. Further, the separator 13 may include a plurality of separators, which may be spirally wound after the positive electrode 11, the negative electrode 12, and the separator 13 are alternately situated. The present invention is not limited thereto, and the electrode assembly 10 may be configured to have a structure including a plurality of sheets of the positive electrode 11, the separator 13, and the negative electrode 12 that are repeatedly stacked.

The electrode assembly 10 may be accommodated in the case 26 together with an electrolyte solution. The electrolyte solution may be made of a lithium salt, such as $LiPF_6$ or $LiBF_4$ with an organic solvent, such as EC, PC, DEC, EMC, or EMC. The electrolyte solution may be in a liquid, solid, or gel state.

The case 26 may be configured to have a substantially cuboidal shape, and an opening may be formed at one side thereof. The case 26 may be formed of a metal, such as aluminum.

Figure 5:
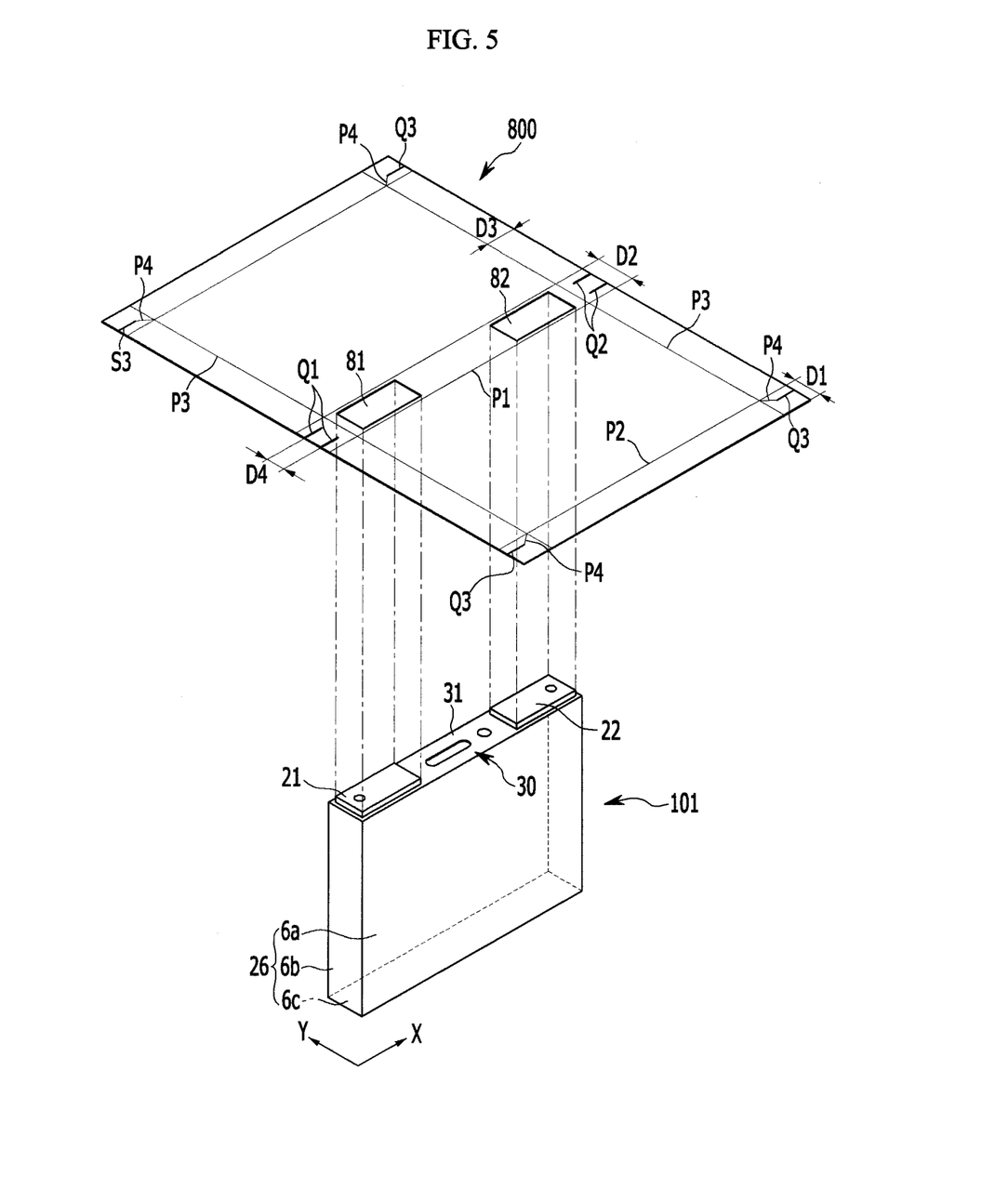
FIG. 5 is an exploded perspective view schematically illustrating a battery assembly and a protective member according to an embodiment of the present invention.

The case 26 may include a bottom surface 6c having a substantially rectangular shape, and, as shown in FIG. 5, may include a pair of first lateral walls 6a and a pair of second lateral walls 6b connected vertically to end portions of the bottom surface 6c, respectively, to form a space for accommodating the electrode assembly 10. The first lateral walls 6a may face each other, and the second lateral walls 6b may be positioned to face each other and may be connected to the first lateral walls 6a. A length of an edge at which the bottom surface 6c and the first lateral wall 6a are connected to each other may be longer than that of an edge at which the bottom surface 6c and the second lateral wall 6b are connected to each other.

The cap assembly 30 may include a cap plate 31 for covering the opening of the case 26 by being bonded to the case 26, and may include a positive terminal 21 and a negative terminal 22, which are externally protruded from the cap plate 31 to be electrically connected to the positive electrode 11 and the negative electrode 12, respectively.

The cap plate 31 may be configured to have a shape of a plate that may be extended in one direction, and that may be bonded to the opening of the case 26. The cap plate 31 may include an injection hole 32 and a vent hole 34 that communicate with an interior of the cap assembly 30. The injection hole 32 may be configured to allow the injection of the electrolyte solution, and a sealing cap 38 may be mounted thereon or therein. Further, a vent member 39 including a notch 39a, which may be opened due to a pressure (e.g., predetermined pressure), may be mounted to, or in, the vent hole 34.

The positive terminal 21 and the negative terminal 22 may be mounted to protrude upward from the cap plate 31. The positive terminal 21 may be electrically connected to the positive electrode 11 via a current collecting tab 41, and the negative terminal 22 may be electrically connected to the negative electrode 12 via a current collecting tab 42.

A terminal connecting member 25 for electrically connecting the positive terminal 21 and the current collecting tab 41 may be mounted between the positive terminal 21 and the current collecting tab 41. The terminal connecting member 25 may be inserted into a hole formed at the positive terminal 21, such that a lower portion thereof may be welded to the current collecting tab 41.

A gasket 59 for sealing may be mounted between the terminal connecting member 25 and the cap plate 31, while being inserted into the hole through which the terminal connecting member 25 may extend. Further, a lower insulating member 43, into which the lower portion of the terminal connecting member 25 may be inserted, may be mounted under the cap plate 31.

A connecting plate 58 for electrically connecting the positive terminal 21 and the cap plate 31 may be mounted between the positive terminal 21 and the cap plate 31. The terminal connecting member 25 may be inserted into the connecting plate 58. Accordingly, the cap plate 31 and the case 26 may be positively electrified.

A terminal connecting member 25 for electrically connecting the negative terminal 22 and the current collecting tab 42, which is similar to the terminal connecting member 25, may be installed between the negative terminal 22 and the current collecting tab 42. The terminal connecting member 25 may be inserted into the hole formed at the negative terminal 22, such that an upper portion and a lower portion of the terminal connecting member 25 may be, respectively, welded to the negative terminal 22 and to the current collecting tab 42.

A gasket for sealing, which is similar to the gasket 59, may be mounted between the negative terminal 22 and the cap plate 31, while being inserted into the hole through which the terminal connecting member 25 may extend. Further, a lower insulating member 45, which is for insulating the negative terminal 22 and the current collecting tab 42 from the cap plate 31, may be mounted under the cap plate 31.

An upper insulating member 54 for electrically insulating the negative terminal 22 and the cap plate 31 may be mounted between the negative terminal 22 and the cap plate 31. The terminal connecting member 25 may be inserted into a hole formed at the upper insulating member 54.

The cap assembly 30 may include a short-circuiting hole 37, and a short-circuiting member 56 that may short-circuit the positive electrode 11 and the negative electrode 12 installed in the short-circuiting hole 37. The short-circuiting member 56 may be between the upper insulating member 54 and the cap plate 31, and the upper insulating member 54 may be configured to have a cutout that may be formed at a position corresponding to the short-circuiting member 56. The short-circuiting member 56 may overlap the negative terminal 22 exposed through the cutout, and may be separately located.

Further, the short-circuiting member 56 may be between the negative terminal 22 and the vent hole 34, and may be located closer to the negative terminal 22 than to the vent hole 34. The short-circuiting member 56 may include a convexly curved portion that curves toward the electrode assembly 10, and may include an edge portion may be formed at an outside of the curved portion and fixed to the cap plate 31.

The short-circuiting member 56 may be deformed to cause a short-circuit when an internal pressure of the battery assembly 101 rises. In other words, the internal pressure of the battery assembly 101 may rise when a gas is generated by an unwanted reaction in the battery assembly 101. When the internal pressure of the battery assembly 101 is increased to be higher than a level (e.g., a predetermined level), the curved portion may be deformed to be concavely curved toward an opposite direction, thereby causing the short-circuiting member 56 to contact the negative terminal 22 to cause a short-circuit.

Meanwhile, an embodiment of the present invention is described by using an example in which the short-circuiting member 56 and the vent member 39 are surrounded by the protective member to be unexposed. However, the present invention is not limited thereto, and the short-circuiting member 56 and the vent member 39 may be exposed selectively through an opening.

Hereinafter, a method for covering the battery assembly of FIG. 3 with the protective member will be described with reference to appended drawings.

Figure 6:
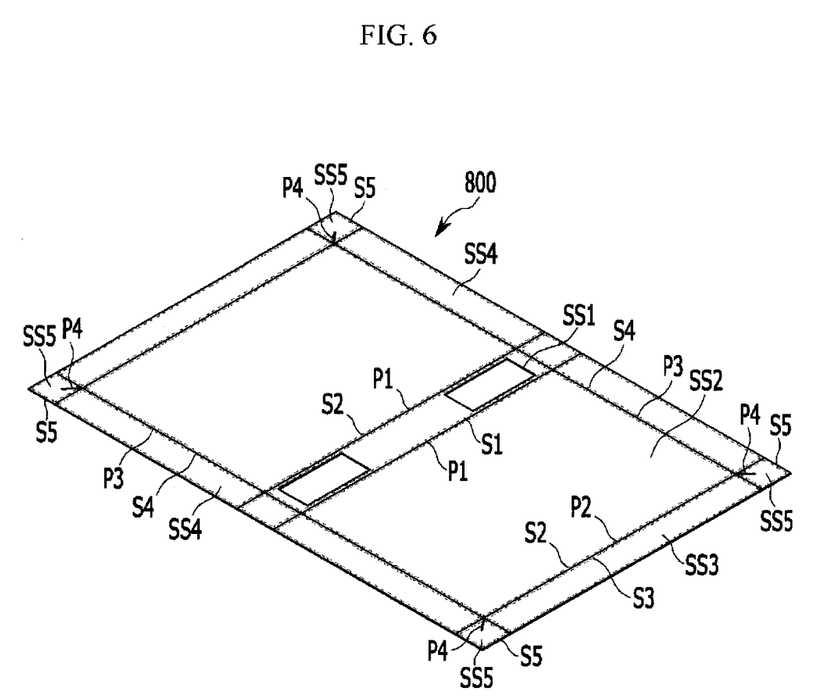
FIG. 6 is a top plan view schematically illustrating the protective member illustrated in FIG. 5.

FIG. 5 is an exploded perspective view schematically illustrating a battery assembly and a protective member according to an embodiment of the present invention, FIG. 6 is a top plan view schematically illustrating a protective member illustrated in FIG. 5, and FIGS. 7, 8, 9, 10, and 11 illustrate a method for covering a protective member according to an embodiment of the present invention.

First, as shown in FIG. 5, the battery assembly 101 and the protective member 800 are prepared, and the protective member 800 may overlap the battery assembly 101. The battery assembly 101 may be the battery assembly of FIGS. 3 and 4, and may be formed by bonding the cap assembly 30 to the opening of the case 26 in which the electrode assembly 10 is accommodated.

The protective member 800 may be in an open state without being folded or rolled, and a first opening 81 and a second opening 82 may be formed to correspond to the positive terminal 21 and the negative terminal 22, respectively.

Referring to FIGS. 5 and 6, the protective member 800 may be formed of one sheet, and may include the first and second openings 81 and 82, which respectively expose the positive terminal 21 and the negative terminal 22 of the battery assembly 101, a plurality of cutting lines Q1, Q2, and Q3, and a plurality of folding lines P1, P2, P3, and P4. An adhesive may be formed on an entire surface of the protective member 800, so that the protective member 800 may be adhered to, and fixed to, the battery assembly 101 by the adhesive.

The first and second openings 81 and 82 may be formed for exposing the positive terminal 21 and the negative terminal 22, and may be dimensioned to have a similar or identical shape to an in-plane shape of the positive terminal 21 and the negative terminal 22. In an embodiment of the present invention, the first and second openings 81 and 82 may be formed to respectively expose the positive terminal 21 and the negative terminal 22. However, the present invention is not limited thereto. As a non-limiting example, the openings 81 and 82 may be formed to respectively expose the connecting plate 58 and the upper insulating member 54 (referring to FIG. 4).

The folding lines P1, P2, P3, and P4 may be formed to be thinner than other parts of the protective member 800 for readily folding the protective member 800. However, the present invention is not limited thereto. As a non-limiting example, the protective member 800 may be folded without additionally forming folding lines that are thinner than other parts of the protective member 800. Accordingly, the folding lines described hereinafter may be formed by folding the protective member 800 along the folding lines that are formed separately.

The folding lines P1, P2, P3, and P4 may include a pair of first folding lines P1 and a pair of second folding lines P2 that may be formed in a first direction, a pair of third folding lines P3 intersecting the first folding lines P1 and the second folding lines P2, and four fourth folding lines P4. The first direction may be a direction from the positive terminal 21 toward the negative terminal 22, and may be referred to as an X-axis direction hereinafter.

The first folding lines P1 may be respectively located at opposite sides of the protective member 800, and may be formed respectively at positions corresponding to edges at which the cap plate 31 and the case 26 are connected to each other. The first and second openings 81 and 82 may be between the first folding lines P1.

Further, the pair of the second folding lines P2 may be formed in a direction parallel to the first folding lines P1, and may be respectively spaced apart from opposite ends of the protective member 800 by a first distance D1. The first distance D1 may be equal to, or greater than, a half of a length D2 of a short side of the case 26 (i.e., a Y-axis directional length of the short side of the case 26). The second folding lines P2 may be formed at positions corresponding to the respective edges at which the first and/or second lateral walls 6a and/or 6b and the bottom surface 6c of the case 26 are connected to each other.

The third folding lines P3 may be formed in a direction intersecting the first folding lines P1 and the second folding lines P2, and may be at opposite sides of the protective member 800, with the first and second openings 81 and 82 therebetween. A second distance D3 from opposite ends of the protective member 800 to the third folding line P3 may be identical to the first distance D1.

The fourth folding lines P4 may be respectively formed at intersecting points of the second folding lines P2 and the third folding lines P3 in a direction that is inclined to the second folding lines P2.

The protective member 800 may be divided into a plurality of regions S1, S2, S3, S4, and S5 by using folding lines P1, P2, P3, and P4. The protective member 800 may be divided into a first region S1 surrounded by the first folding lines P1 and the third folding lines P3. A plurality of second regions S2 may be surrounded by respective ones of the first folding lines P1, the second folding lines P2, and the third folding lines P3. Third regions S3 may be located between a short side (X-axis direction) of the protective member 800 and the second folding lines P2. Fourth regions S4 may be located between a long side (Y-axis direction) of the protective member 800 and the third folding lines P3. Fifth regions S5 may be at edges of the protective member 800 and surrounded by the second folding lines P2 and the third folding lines P3.

Hereinafter, portions of the protective member 800 corresponding to the first regions S1, the second regions S2, the third regions S3, the fourth regions S4, and the fifth regions S5 may be referred to as first sub members SS1, second sub members SS2, third sub members SS3, fourth sub members SS4, and fifth sub members SS5, respectively.

The cutting lines Q1, Q2, and Q3 may be formed in parallel in one direction. As a non-limiting example, the direction may be the X-axis direction, which extends from the positive terminal 21 toward the negative terminal 22.

The cutting lines Q1, Q2, and Q3 may include a pair of first cutting lines Q1 formed on one fourth sub member SS4 adjacent the first opening 81, a pair of second cutting lines Q2 formed on one fourth sub member SS4 adjacent the second opening 82, and a plurality of third cutting lines Q3 formed at the edges of the protective member 800 (i.e., on the fifth sub members SS5). Lengths of the first cutting lines Q1, the second cutting lines Q2, and the third cutting lines Q3 may be similar or identical to each other.

The first cutting lines Q1 may extend from an edge of a first long side of the protective member 800 toward the third folding line P3 adjacent the first opening 81. If the ends of the first cutting lines Q1 and the third folding line P3 were to be connected to each other, or were to meet, the ends of the first cutting lines Q1 may be at the edge of the battery assembly 101, because the third folding line P3 may be on the edge of the battery assembly 101 (e.g., if the first cutting lines Q1 were to meet the third folding line P3, the edge where the second lateral wall 6b meets the cap plate 31 may be exposed after the protective member 800 covers the rest of the battery assembly 101, thereby leaving a portion of the battery assembly 101 uncovered). The first cutting lines Q1 may be adjacent each other.

Accordingly, the ends of the first cutting lines Q1 and the third folding line P3 may be adjacent each other without being connected to each other, because the edge of the battery assembly 101 may otherwise be exposed without being covered with the protective member 800.

A distance D4 between the first cutting lines Q1 may be equal to, or shorter than, the length D2 of the short side of the case 26. When the length D2 of the short side of the case 26 and the distance D4 between the first cutting lines Q1 are identical to each other, the first cutting lines Q1 may each be at an edge of the battery assembly 101 (e.g., the first cutting lines Q1 may each be at a respective edge of the battery assembly 101 where the first lateral walls 6a meet one of the second lateral walls 6b toward the cap plate 31) to expose edges of the battery assembly 101 even after the protective member 800 is folded to cover the battery assembly 101.

The second cutting lines Q2 may extend from a second long side of the protective member 800, which may be opposite to the first long side of the protective member 800, toward the third folding line P3 adjacent the second opening 82. Ends of the second cutting lines Q2 may be adjacent the third folding line P3 without being connected thereto. A distance between the second cutting lines Q2 may be similar to, or identical to, the distance D4 between the first cutting lines Q1, and respective ones of the first cutting lines Q1 and the second cutting lines Q2 may be aligned.

The third cutting lines Q3 may be at the fifth sub members SS5, which may be at the edges of the protective member 800, and one end of the third cutting lines Q3 may be respectively connected to one end of the fourth folding lines P4. A distance between the third cutting lines Q3 and the second folding lines P2 may be similar to, or identical to, a distance between the first cutting lines Q1 and the first folding lines P1.

Figure 7:
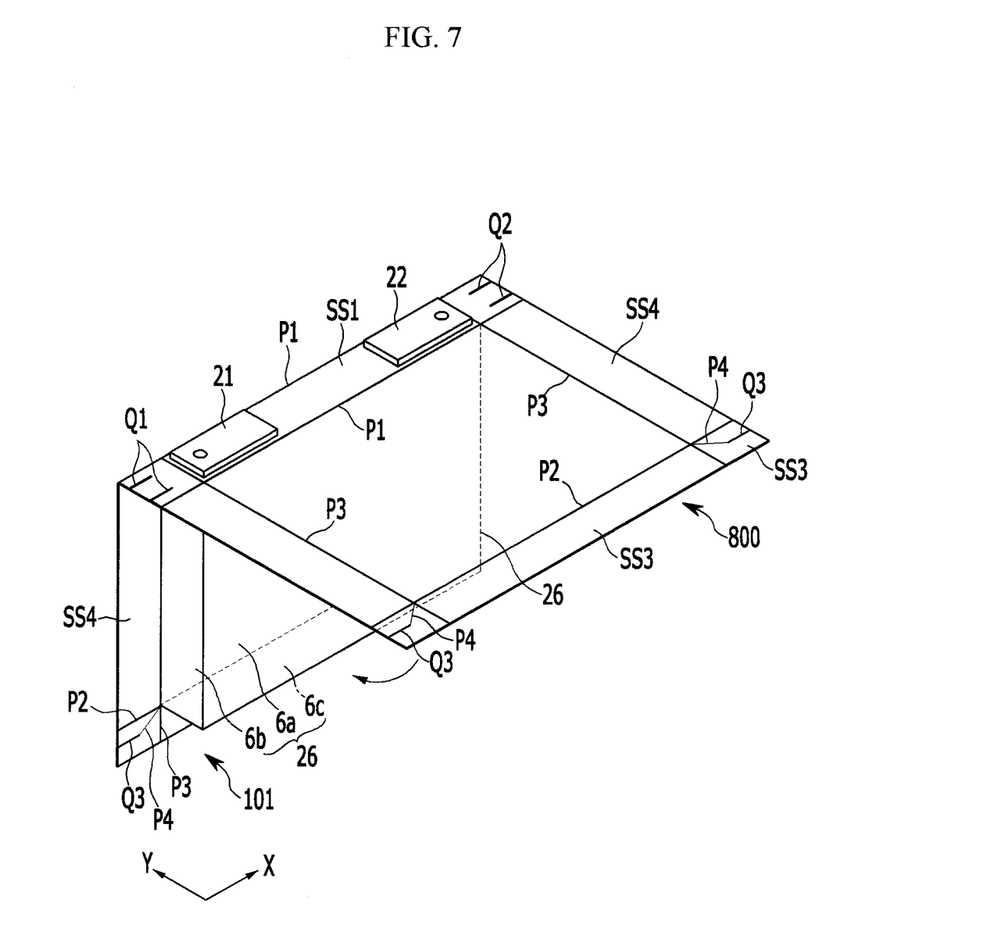
FIGS. 7, 8, 9, 10, and 11 illustrate a method of covering the protective member according to an embodiment of the present invention.

The positive terminal 21 and the negative terminal 22 may be respectively inserted into the first opening 81 and the second opening 82 to protrude to outside of the first opening 81 and the second opening 82, as shown in FIG. 7.

Thereafter, the protective member 800 may be folded along the first folding lines P1 (referring to an arrow shown in FIG. 7). When the protective member 800 is folded along the first folding lines P1, the second sub members SS2 of the protective member 800 may respectively contact surfaces of the first lateral walls 6a. Herein, the protective member 800 may be adhered to the surfaces of the first lateral wall 6a by the adhesive on one surface of the protective member 800.

Figure 8:
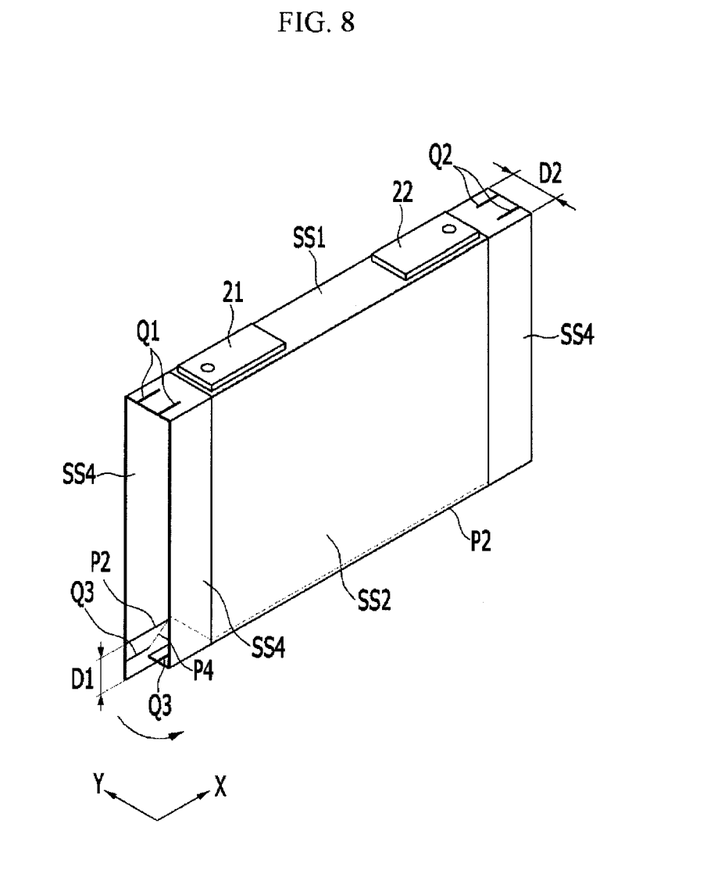
Figure 9:
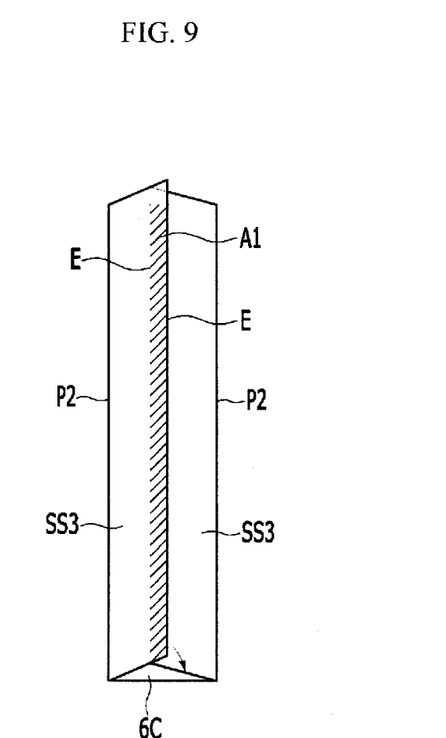

Next, as shown in FIGS. 8 and 9, the protective member 800 may be folded along the second folding lines P2. When the protective member 800 is folded along the second folding lines P2, the third sub members SS3 of the protective member 800 may contact the bottom surface 6c of the case 26, and may be adhered to the bottom surface 6c by the adhesive.

Meanwhile, the second folding lines P2 may be spaced from the end of the protective member 800 by the first distance D1, and the first distance D1 may be equal to, or greater than, a half of the length D2 of the short side of the case 26.

A width of the third sub members SS3 vary depending on the first distance D1. Accordingly, when the protective member 800 is folded along the second folding lines P2, when the first distance D1 is equal to half of the length D2 of the short side of the case 26, the end E of the third sub members SS3 that are folded in the opposite direction may coincide with each other, because the width of the third sub members SS3 may each be equal to half of the length D2 of the short side of the case 26.

Accordingly, the second folding lines P2 may be spaced from the end of the protective member 800 by the first distance D1. However, the first distance D1 may not be the same as half of the length D2 of the short side of the case 26 due to an error (e.g., processing error). In the case that the first distance D1 is not the same as the half of the length D2 of the short side of the case 26, as above, the end portion of the third sub members SS3 that are folded in the opposite direction might not extend enough to contact each other, and may be spaced apart, thereby exposing the bottom surface 6c of the case 26.

Accordingly, the bottom surface 6c of the case 26 might be covered by instead forming the first distance D1 to be greater than the half of the length D2 of an end portion width of the case 26 in consideration of the processing error. If the first distance D1 is greater than the length D2, as above, the width of the third sub members SS3 may increase, so that a first bonding portion A1 may be formed by overlapping the edges of the third sub members SS3. The line of the first bonding portion may be orthogonal to the line of the second bonding portions.

Figure 10:
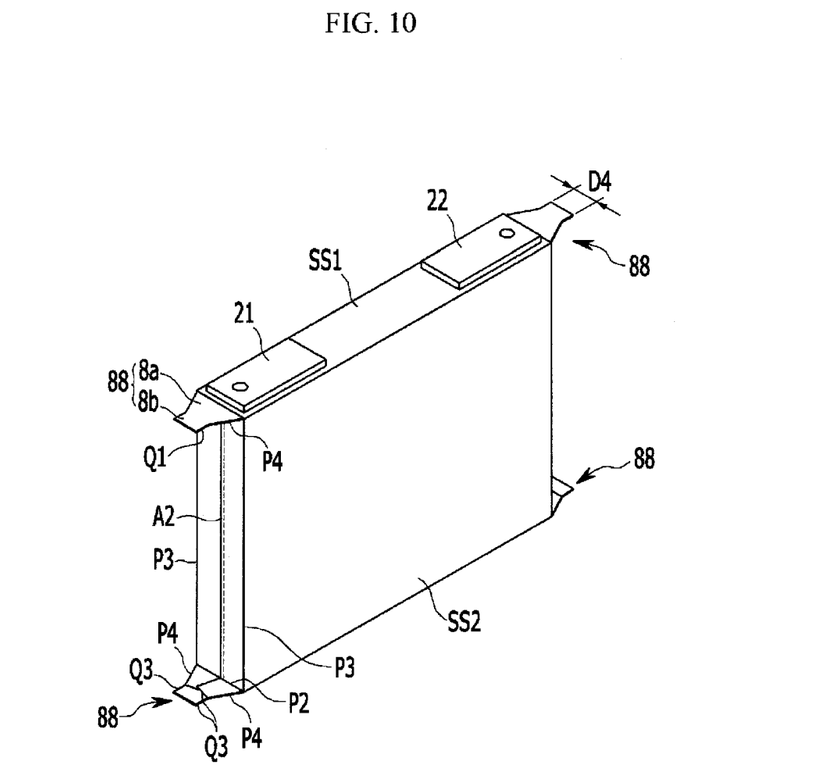

Next, as shown in FIG. 10, the protective member 800 may be folded along the third folding lines P3 and the fourth folding lines P4. When the protective member 800 is folded along the third folding lines P3 and the fourth folding lines P4, as above, a second bonding portion A2, and a plurality of finish portions 88, may be formed by allowing the fourth sub members SS4 of the protective member 800 to respectively contact surfaces of the pair second lateral walls 6b of the case 26.

Herein, all of the fourth sub members SS4 of the protective member 800 may be on the short side and on the long side of the second lateral walls 6b, and may surround the second lateral wall 6b of the case 26 together with the fifth sub member SS5. Accordingly, the fourth sub members SS4 and the fifth sub members SS5 that surround the second lateral walls 6b might not be readily folded by a single action. However, according to an embodiment of the present invention, those may be folded readily by forming the first cutting lines Q1, the second cutting lines Q2, and the third cutting lines Q3.

Specifically, because the fourth sub members SS4 are partially separated by the first cutting lines Q1 and the second cutting lines Q2, and because the fifth sub members SS5 are partially separated by the third cutting lines Q3, when the protective member 800 is folded along the third folding lines P3 and the fourth folding lines P4, the fourth sub members SS4 and the fifth sub members SS5 may be partially separated by the first cutting lines Q1, the second cutting lines Q2, and the third cutting lines Q3, so that the fourth sub members SS4 are readily folded toward the second lateral walls 6b of the case 26.

Meanwhile, the third folding lines P3 may also be spaced from the end of the protective member 800 by the second distance D3. Because the width of the fourth sub members SS4 may vary depending on the second distance D3, the fourth sub members SS4 may have a width that is equal to, or greater than, the length D2 that is half of the width of the short side of the case 26 to cover the second lateral wall 6b of the case 26 with the fourth sub member SS4 not to be exposed.

When the protective member 800 is folded along the third folding lines P3, the second bonding portion A2 may be formed by overlapping the edges of the fourth sub members SS4. Then, when the fourth sub members SS4 are folded along the fourth folding lines P4 and the first folding lines P1, the finish portions 88 located at the upper portion of the case 26 are formed by overlapping the fourth sub members SS4 at the opposite sides with respect to the first folding lines P1.

Further, when the fourth sub members SS4 are folded along the fourth folding lines P4 and the second folding lines P2, the finish portions 88 at the lower portion of the case 26 may be formed by overlapping the fifth sub members SS5 and the fourth sub members SS4 at the opposite sides with respect to the second folding line P2.

Each of the finish portions 88 may include a first part 8a connected to the protective member 800, and a second part 8b extended from the first part 8a. The first part 8a may overlap the corresponding fourth sub member SS4, or the fourth sub members SS4 may overlap the fifth sub members SS5.

The width of the first part 8a may become narrower as the first part 8a approaches the second part 8b from the protective member 800, and the width of the second part 8b may be similar to, or identical to, the distance D4 between the first cutting lines Q1.

Figure 11:
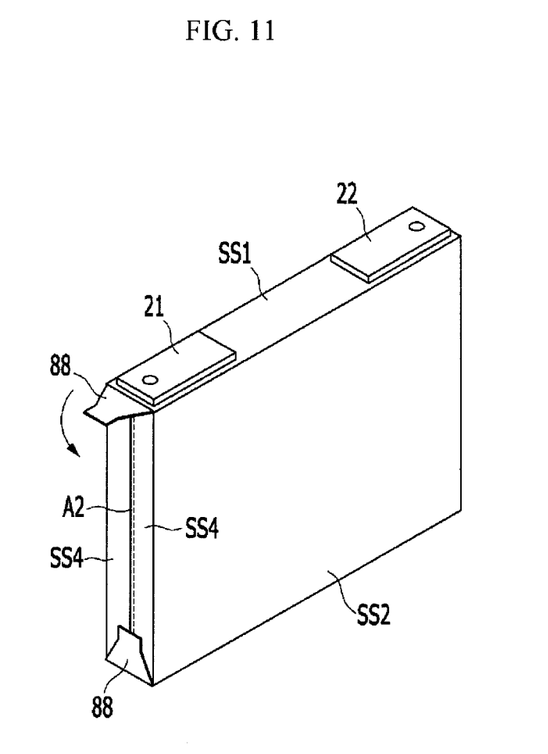

Next, as shown in FIG. 11, the finish portions 88 may be folded (referring to the arrow shown in FIG. 11) to overlap the second bonding portion A2 of the case 26, and then may be fixed by thermal bonding.

As described above, all surfaces of the battery assembly 101 may be covered with one sheet of the protective member having a sheet shape according to an embodiment of the present invention. A sealing force at a connecting portion of the battery assembly may be improved by covering the edge of the battery assembly with the protective member.

Therefore, by minimizing or reducing the part directly exposing the case or a cap plate to the outside, a damage otherwise caused by exposure may be minimized or reduced. Further, the sealing force of the rechargeable battery may be further improved, because a gap, which may be generated between the case and the cap plate due to the processing error or the like, may be covered with the protective member.

While embodiments of the present invention have been described in connection with what is presently considered to be practical embodiments, it is to be understood the present invention is not limited to the disclosed embodiment, but, on the contrary, is intended to cover various modifications and equivalent arrangements included within the spirit and scope of the appended claims and their equivalents, detailed descriptions, and accompanying drawings.

| Description of Some of the Reference Characters | |
|---|---|
| 6a: first lateral wall | 6b: second lateral wall |
| 6c: bottom surface | 10: electrode assembly |
| 11: positive electrode | 11a: positive electrode uncoated region |
| 12: negative electrode | 12a: negative electrode uncoated region |
| 13: separator | 21: positive terminal |
| 22: negative terminal | 25: terminal connecting member |
| 26: case | 30: cap assembly |
| 31: cap plate | 32: injection hole |
| 34: vent hole | 39a: notch |
| 41, 42: current collecting tab | 43, 45: lower insulating member |
| 54: upper insulating member | 56: short-circuiting member |
| 58: connecting plane | 59: gasket |
| 81, 82: opening | 88: finish portion |
| 101: battery assembly | 800: protective member |

What is claimed is:

1. A rechargeable battery comprising:
   an electrode assembly comprising a first electrode, a separator, and a second electrode;
   a case for accommodating the electrode assembly, and defining an opening at a side of the case for receiving the electrode assembly;
   a cap assembly mounted to the case at the opening of the case, and comprising a first electrode terminal and a second electrode terminal respectively electrically connected to the first electrode and the second electrode; and
   a protective member for covering the case and the cap assembly, and comprising a first bonding portion corresponding to a bottom surface of the case, a plurality of second bonding portions respectively corresponding to first lateral walls of the case, and a plurality of finish portions respectively overlapping opposite ends of the second bonding portions,
   wherein the plurality of finish portions are smaller than the second bonding portions, and are formed by respective pairs of parallel cutting lines extending from an edge of the protective member to form a discontinuity between the finish portions and the second bonding portions along the edge of the protective member, and
   wherein the finish portions respectively comprise a first part becoming narrower when approaching an end of the first part, and a second part formed by one of the pairs of the parallel cutting lines and extending from the end of the first part.

2. The rechargeable battery of claim 1, wherein the first lateral walls of the case face each other, and wherein the case further comprises a pair of second lateral walls connected to the first lateral walls for defining a space for accommodating the electrode assembly.

3. The rechargeable battery of claim 2, wherein the first bonding portion comprises third sub members for overlapping the bottom surface of the case.

4. The rechargeable battery of claim 3, wherein a width of one of the third sub members is equal to, or greater than, a half of a width of the bottom surface of the case.

5. The rechargeable battery of claim 4, wherein the width of the bottom surface of the case is equal to a width of the one of the third sub members in a direction perpendicular to a second folding line that is formed by folding the one of the third sub members to the bottom surface.

6. The rechargeable battery of claim 4, wherein edges of the third sub members overlap.

7. The rechargeable battery of claim 1, wherein the finish portions are respectively folded along fourth folding lines from a cap plate toward the first lateral walls.

8. The rechargeable battery of claim 7, wherein the first part overlaps the protective member, and wherein the second part extends from the first part.

9. The rechargeable battery of claim 1, wherein the finish portions are respectively welded to the second bonding portions.

10. The rechargeable battery of claim 1, wherein a line of the first bonding portion is orthogonal to a line of the second bonding portions.

11. The rechargeable battery of claim 1, wherein the protective member defines openings for exposing the first electrode terminal and the second electrode terminal, respectively.

* * * * *